(12) United States Patent
Hao et al.

(10) Patent No.: US 8,316,052 B2
(45) Date of Patent: Nov. 20, 2012

(54) METHOD, COMPUTER PROGRAM PRODUCT AND APPARATUS FOR PROVIDING MEDIA SHARING SERVICES

(75) Inventors: Jianxiu Hao, Lexington, MA (US); Gaurav D. Mehta, Brookline, MA (US); Diego S. Rozensztejn, Brookline, MA (US); Serkan Tosun, Waltham, MA (US); Diego Crespo, Hoboken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 794 days.

(21) Appl. No.: 11/609,695

(22) Filed: Dec. 12, 2006

(65) Prior Publication Data
US 2008/0140664 A1    Jun. 12, 2008

(51) Int. Cl.
*G06F 17/30* (2006.01)

(52) U.S. Cl. .......................... 707/783; 707/791; 709/217

(58) Field of Classification Search .................. 707/200, 707/783–784, 791; 709/217; 455/217
See application file for complete search history.

(56) References Cited

U.S. PATENT DOCUMENTS

| | | | |
|---|---|---|---|
| 2006/0173974 A1* | 8/2006 | Tang | 709/217 |
| 2007/0156770 A1* | 7/2007 | Espelien | 707/200 |
| 2007/0207755 A1* | 9/2007 | Julia et al. | 455/217 |

* cited by examiner

Primary Examiner — Huawen Peng (57) ABSTRACT

Embodiments may include receiving various media files, such as pictures, videos, and music, for users within a telecommunication environment. The users may send the media files through various communication devices including cellular phones and computing devices. Embodiments may allow access to the received media files to the users through the communication devices. Access may be limited to the media files by membership within a group or other access levels associated with a particular media file or a corresponding media folder. Embodiments may also include receiving a media file in a first format from a transferring communication device, and converting and sending the media file in a second format that is suitable for a requesting communication device.

20 Claims, 8 Drawing Sheets

METHOD, COMPUTER PROGRAM PRODUCT AND APPARATUS FOR PROVIDING MEDIA SHARING SERVICES

BACKGROUND INFORMATION

Various mobile computing devices allow users to view, listen, or watch media files, such as pictures, songs, and videos. Often a mobile computing device, such as a digital camera, cellular phone, MP3 player, etc., is limited in the type of media file that is playable on the device. And a user may have several of these computing devices in order to play several different types of media files.

Users often want to share their media files with other users. But with the number of different kinds of media files and computing devices, sharing media files between users may be challenging. For example, the computing devices may not be compatible or the media file intended to be share is not easily transferable to another user's computing device. Sharing media files among multiple users becomes even more challenging due to the number of computing devices and the possibility of incompatibility between the numerous computing devices or other issues associated with transferring media files to numerous computing devices.

DETAILED DESCRIPTION OF PREFERRED EMBODIMENTS

Exemplary embodiments are described hereinafter with reference to the accompanying drawings, in which exemplary embodiments and examples are shown. Like numbers refer to like elements throughout.

Embodiments relate to providing media sharing services to one or more users of communication devices. Each communication device is configured to operate within a telecommunication environment 100, such as the one illustrated in FIG. 1, in which the communications devices 10, 11, 12, 13 may be selectively and communicatively coupled to one another for receiving and transmitting information. The information may be in a variety of forms including voice signals, text messages, media files, programming instructions, and other data formats. The communication devices 10, 11, 12, 13 may be communicatively coupled to each other through one or more communication networks 104, 105, 106.

Figure 1:
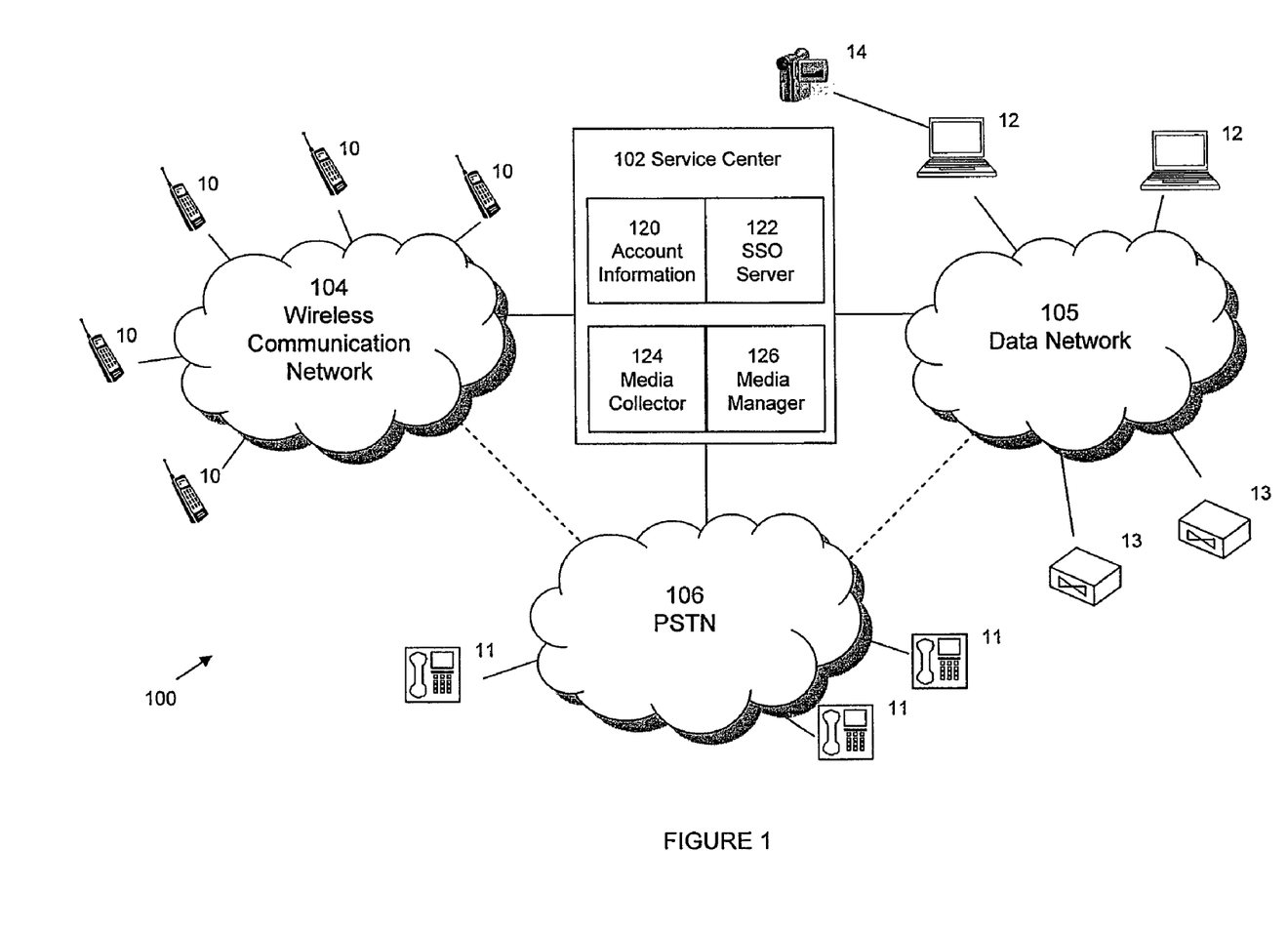
FIG. 1 is a block diagram of a telecommunication environment consistent with exemplary embodiments.

For example, the communication devices may include one or more mobile devices 11, such as cellular phones, personal digital assistants ("PDA"), pagers, or any other wireless personal communication system ("PCS") operable within a wireless communication network 104. The wireless communication network may be based on a variety of technologies and platforms including SS-7 based networks, cellular or third-generation cellular networks, or as a more specific example Verizon's Wireless Network. The wireless communication network may be data-enabled allowing for the digitalization of voice signals and the transmission of other digital data. For example, the wireless communication network may be Verizon's Wireless Network with EVDO or evolution-data optimized services.

As another example, the communication devices may include one or more computing devices 12, such as desktops and laptops, that are within or directly connected to a data network 105, such as a Wide Area Network ("WAN"), Local Area Network ("LAN"), an intranet and/or the Internet, and having various communication programming applications including email, Internet browser, instant or text messaging, or voice over IP (VOIP) applications.

Figure 2:
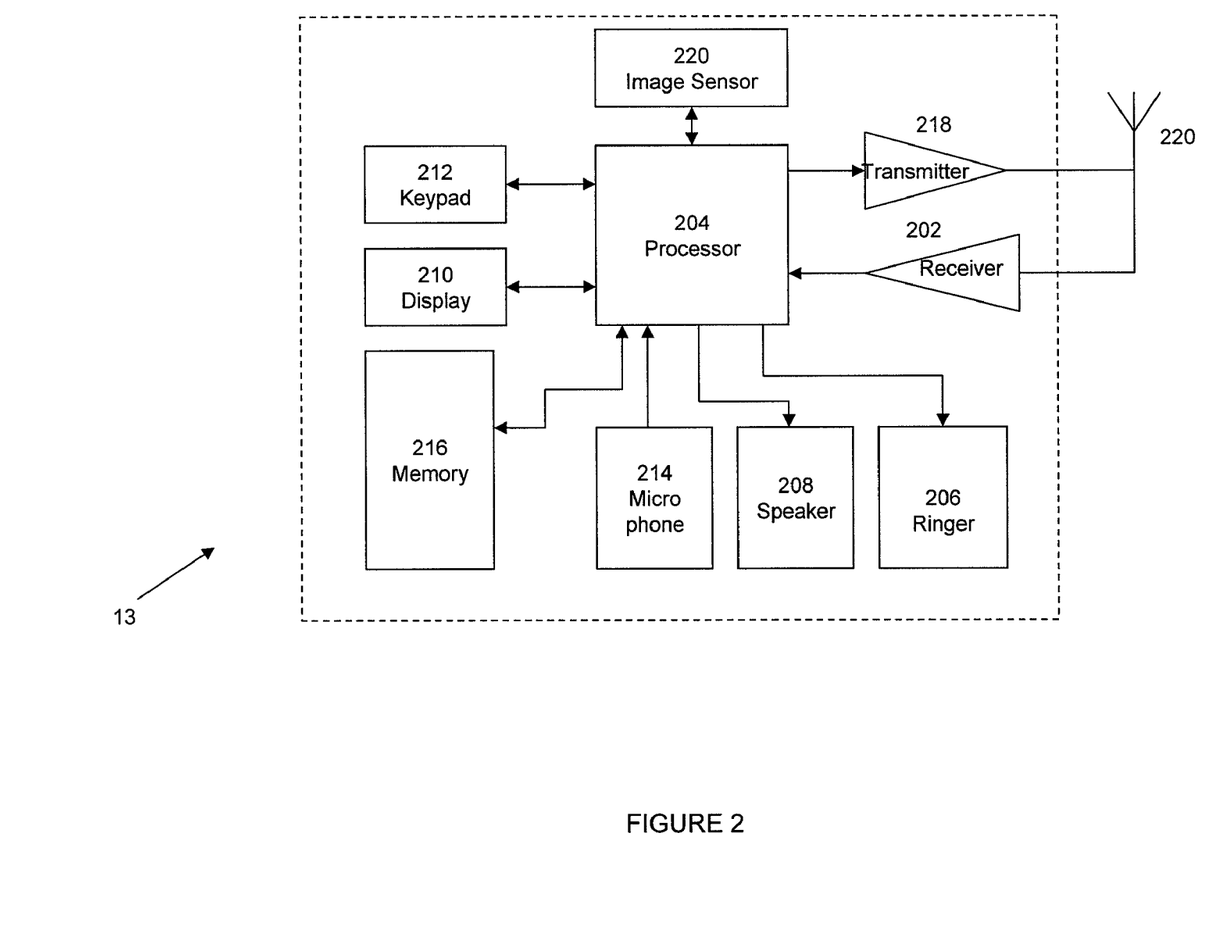
FIG. 2 is a block diagram of a mobile telephone consistent with exemplary embodiments.

Another communication device may be a set top box 13. The set top box is configured 13 to receive one or more signals representing a media program from an external source and convert the signals into the media program for display on a television. FIG. 2 illustrates an example of a set top box 13. The set top box 13 may include a first transmitter 302, a first receiver 304, a processor element 306, a keypad 308, a display 310, at least a first memory element 312, a second transmitter 314, and a second receiver 316. The first receiver 304 is configured to receive the media program from the external source through a data network 105. For example, the set top box may include an adapter or port for receiving a fiber optic cable or a coaxial cable of a data network. And the external source may be one or more media content servers or other computing devices of a media provider that is communicatively coupled to the set top box through the data network. The processor element 306 may be configured to provide processing and command functions, which may include translation or conversion of the received signals into an output suitable for display on the television. The processor element 306 may also be configured to send the media program through the second transmitter 314 of the set top box 13 to the television. Although not illustrated, the media set top box may have a third transmitter and the processor 306 may be configured to process the received signals into two outputs, i.e. a video output sent through the second transmitter for display on the television and a sound output sent through the third transmitter to a sound system either integrated with the television or a stand alone system. The display of the set top box may include information such as a clock and/or the current channel for the television, and/or indicators on whether or not the set top box is on and/or whether it is recording. The keypad 308 may include one or more buttons to allow a user to enter commands and selections into the set top box 13. The second receiver 316 may be configured to receive radio signals from a remote control device (not illustrated) as another method of receiving commands and selections from a user. The processor element 306 may also be configured to send a request through the first transmitter 302 to the media provider for particular media program based on commands and selections from the user. The request may include a live media program or for a video on demand ("VOD"). The processor element 306 may also record the signals for the requested media program into the memory element 312 based on commands and selections from the user. For example, the user may request for a future program to be recorded. At the scheduled time for the media program, the processor element 306 may request the corresponding signals for the media program, also referred to herein as media programming signals, and store the media programming signals into the memory element. The stored or recorded media program is viewable to the user upon request. In particular, the processor element 306 may retrieve a recorded program from the memory element 312 and send it to the television to be viewed by the user upon request from the user. The memory element 312 may also maintain programming instructions, i.e. software, pertaining to the functions and operability of the set top box.

In yet another example, the communication devices may include one or more telephone devices 11 connected to the Public Switched Telephone Network ("PSTN") 106 or a private branch exchange ("PBX"). Moreover, a communication device may be part of a hybrid apparatus (not illustrated) that is configured to work within more than one type of communication networks. For example, the communication device may be telephone device configured to work both within a wireless network and landline or wired network.

As illustrated in FIG. 1, the telecommunications environment 100 may also include at least one service center 102. The service center 106 may provide a platform for managing information or communications between the differing networks 104, 105, 106 and between communications devices 10, 11, 12, 13 within the same network or differing networks. The service center 102 may also provide gateway functions, such as code and protocol conversions, to transfer information or communications between the networks 104, 105, 106. The service center 102 may be implemented using a combination of hardware, software, and/or firmware. For example, the service center 102 may be implemented using a plurality of general purpose computers or servers. Although the service center 102 is shown with direct connections to the networks 104, 105, 106 any number and type of network elements may be interposed between the service center 102 and any one or all of the networks. Moreover, it is understood that the service center 102 may be connected to different, additional, or less communication networks than what is illustrated in FIG. 1.

The service center 102 may also provide account management functions for the plurality of users of the communication devices 10, 11, 12 operating within the telecommunications environment 100. For example, the service center 102 may include at least a first computing device, referred to herein as an account information server 120. The account information server 120 may store accounts for one or more of the users of the communication devices 10, 11, 12. The account information server 120 may include or otherwise be in communication with at least one memory element for storing the information and a processor element for processing the information, including in response to a request or instructions received from users. In general, an account includes information and/or instructions pertaining to a particular user. The service center may further include a second computing device, referred to herein as a single sign-on server or SSO server 122. The SSO server may be configured to authenticate and approve access to information stored within the account information server 120 or other information stored in additional servers of the service center 102. In particular, the user may access his account on the account information server 120 by logging on through the SSO server 122 by using one of the communication devices 10, 11, 12. For example, the user may be able to log on through a web page on a computing device 12.

Again as an example, a user may use more than one communication device 10, 11, 12 and may prefer a particular communication device depending on the circumstances. The user may have a cellular phone 10, a home phone 11, a work phone (not illustrated), and a computer 12 at work. The user may want to have calls to his home phone 11 forwarded to his cell phone 10 when he is away from his house and/or to have his calls to his cell phone 10 forwarded to his home phone 11 when he is at home. The communication device to which the user wants his calls forwarded is referred to as "the receiving communication device." For this example, when the user is away from home, the cellular phone is the receiving communication device and the home phone is a forwarding communication device; and when the user is home, the home phone is the receiving communication device and the cellular phone is a forwarding communication device. These forwarding instructions may be stored as part of the user's account at the account information server 120. The forwarding instructions may include a default receiving communication device in absence to specific instructions stating otherwise. The user may establish forwarding instructions to include times or circumstances to forward calls or may access his account through the SSO server 122 to change the forwarding instructions at the time he wants the forwarding instructions to change.

As yet another example of information forming part of an account, an account information server 120 may store address books and/or call histories regarding each of the communication devices 10, 11, 12 of the user such that the user may review a history of incoming, outgoing, and missed calls to one of his communication devices 10, 11, 12.

Other information stored within or otherwise accessible by the account information server 120 may be one or more groups of which the user is a member. A group is a list of one or more other users. Each user of a particular group may be referred to as a member user for that particular group. A group may be created by one or more users through their communication devices. For example, a first user may request the formation of a group from one of the communication devices of the first user to the account information server or another computing device of the service center. The first user may also request that the service center send messages to additional users to join the created group or additional users may join the group by request through their communication devices. A group may also be created at least partially by the account information server 120 or other devices of the service center 106. For example, a processor element of the account information server 120 may create a group from other users identified through call histories of the communication devices 10, 11, 12 of a first user that are stored within the account information server 120. Or as another example, the processor element of the account information server 120 may create a group of users based on one or more common attributes of the various users' accounts stored at the account information server 120. A user may be a member user of more than one group. For example, a user may be a member user of a first group of friends or of other social relationships, a second group of business associates, a third group created by the call histories of the first user's communication devices and so on.

Embodiments relate to providing media sharing services between member users of a group. In general, media sharing services includes any service that allows a user to share a media file with another user. A media file may contain media data corresponding to a picture, music, or a video. Each media file may have associated media metadata that described the media file. For example, the metadata may contain any or all of the following information pertaining to the media file: data type (e.g., picture, video, music), data/time at which the media file was created or otherwise edited, a location pertaining to either the media file or ownership of the media file (e.g., longitude and latitude or zip code, or city, state, country), owner identification of the media file, a directory path for the media data (i.e., original media data storage place), streaming/showing path/URL for the media data from a publication or streaming server, a description, review, or blog regarding the content of the media file, and multi-media description about the media such as a voice recording.

Figure 3:
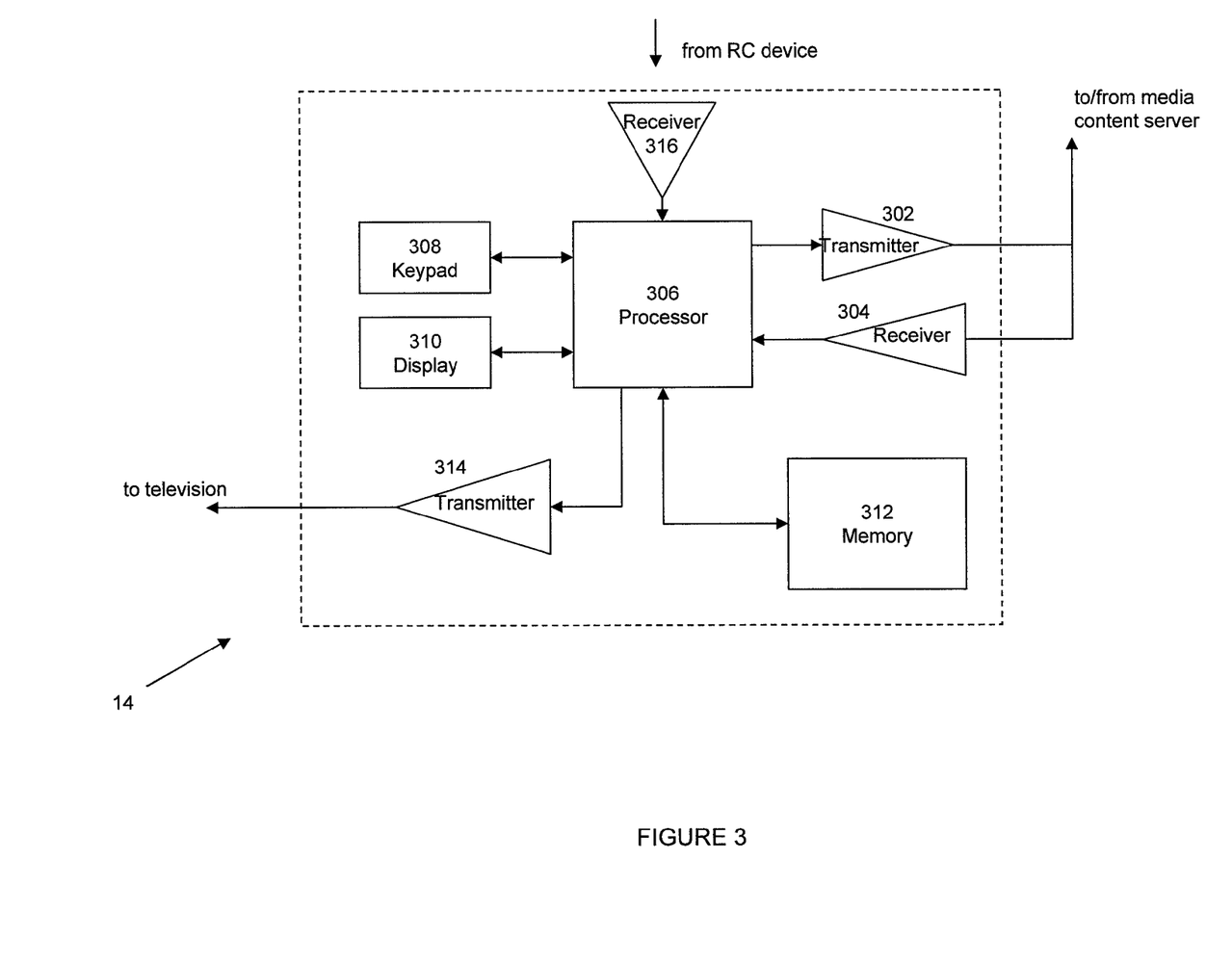
FIG. 3 is a block diagram of a set top box consistent with exemplary embodiments.

A media file may be created by one or more of the communication devices. For example and as discussed above, a communication device may be a cellular phone. The cellular phone may have, among other things, a camera device for capturing pictures or images. FIG. 3 illustrates an example of a cellular phone 10 having a camera device, i.e. an image sensor 220. The cellular phone 10 may include a receiver 202, a processor element 204, a ringer 206, a speaker 208, a display 210, a keypad 212, a microphone 214, at least one memory element 216, a transmitter 218, an antenna 220, and the image sensor 220. The receiver 202 may be configured to receive incoming signals to the cellular phone 10. The incoming signals may originate from other communication or peripheral devices or other elements of the telecommunication environment 100 and be routed through the wireless communication network 104 to the cellular phone 10. The processor element 204 processes the received signal and determines a response. For example, if the incoming signal is a telephone call from another communication device, the processor element 204 may command the ringer 206 to activate to alert the user of the cellular phone 10 of the incoming telephone call. The processor 204 may also command the display to show the telephone number of the incoming call and may review the memory element 216 to determine whether the identity of the caller is known and display that as well. The speaker 208 allows the user to hear the caller and the microphone 214 allows the user to talk back to the caller. The transmitter 218 transmits the user's return signal or call back to the caller. The keypad 212 allows the user to enter phone numbers, move through menus that are shown on the display and provided by an application platform of the cellular phone 10, and select and enter commands into the cellular phone 10. In some embodiments, the processor element 204 may be able to accept some voice commands through the microphone. The memory element 216 may maintain various information such as a call history, a contact list, or user preferences; or programming instructions pertaining to the operability of the cellular phone 10. The image sensor 220 is configured to capture images at a preset interval. The image sensor 220 may capture individual images to create a picture file or capture a series of images to form a video file. The processor element 204 is configured to receive the captured images and either store the images in the at least one memory element 216 and/or send the captured images through the transmitter 218 to another communication device 10, 11, 12 or element of the telecommunication environment 100.

A media file may also be created by a peripheral device 14 of one of the communication devices 10, 11, 12, as shown in FIG. 1. For example and as discussed above a communication device may be a laptop, desktop, or other computing device 12 connected to or otherwise in communication with a data network 105. The peripheral device 14 may be a scanner, a video camera, an audio recorder, or any other device that is connectable to or may be in communication with one of the communication devices 10, 11, 12 of the telecommunication environment 100. The peripheral device 14 may be configured to capture images including videos, record audio including music and songs, or to create other media files. The media files created by the peripheral device 14 may be uploaded or otherwise transferred to one of the communication devices 10, 11, 12. It is also understood that a communication device 10, 11, 12 may receive a media file from another communication device 10, 11, 12. For example, one computing device 12 may email another computing device 12 having a media file attachment. Or other file transferring protocols may be used to transfer media files between a first computing device 12 and a second computing device 12. As used herein, a recording device is the communication or peripheral device that created a particular media file.

As illustrated in FIG. 1, the service center 102 may also include a media collector 124 and a media manager 126. One or both of the media collector 124 and the media manager 126 may be implemented using a combination of hardware, software, and/or firmware. For example, the media collector 124 and the media manager 126 may be implemented using a plurality of general purpose computers or servers. Although the media collector 124 and the media manager 126 are generally described and illustrated as separate elements, in some embodiments the two may be combined and integrated into a single apparatus or system.

Figure 4:
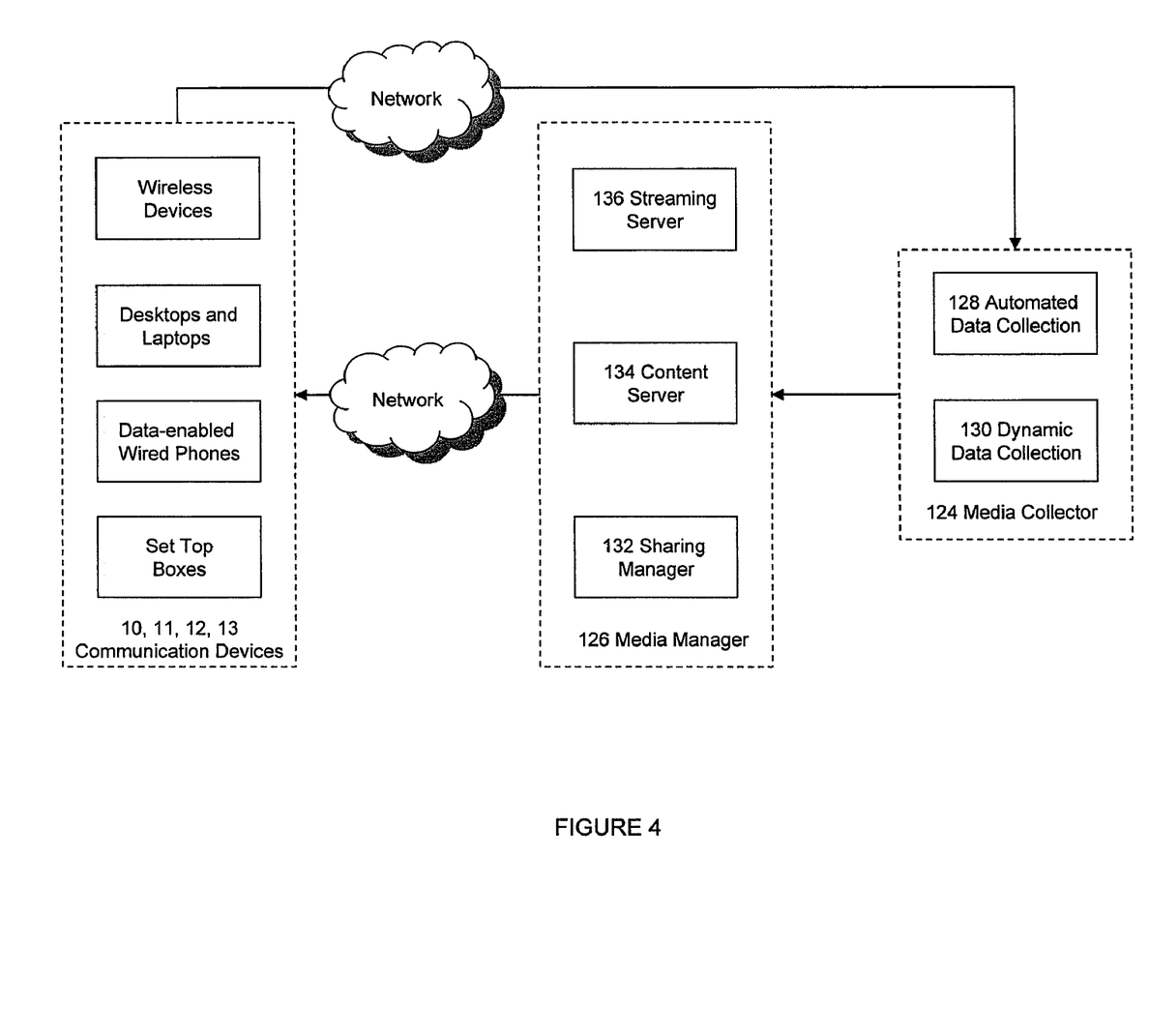
FIG. 4 is a block diagram of a media collector and media manager consistent with exemplary embodiments.

In general, the media collector 124 is configured to receive media files and the associated metadata from the communication devices 10, 11, 12, 13. The media collector 124 may receive the media files and associated metadata through bulk updates. In particular, either by request from the service center 102 to one or more communication devices 10, 11, 12, 13 or based on predetermined intervals or other established criteria, such as the powering on or off of a communication device, one or more communication devices 10, 11, 12, 13 may send media files to the media collector 124. The communication devices 10, 11, 12, 13 may further be configured to send only media files not previously sent to the media collector 124. As illustrated in FIG. 4, the media collector 124 may include an automated data collector 128 for receiving the bulk updates. The media collector 124 may also receive media files and the associated metadata through uploads from a communication device 10, 11, 12, 13 initiated from a user. In particular, a user may upload a media file and associated metadata on demand. For example, a user may enter a command into a communication device 10, 11, 12, 13 to send a stored media file and associated metadata in real time, i.e. the communication device will attempt to send the media file immediately or soon after the command is entered. As illustrated in FIG. 4, the media collector 124 may include a dynamic media data collector 130 for receiving the on demand uploads. As used herein, a transferring communication device is the communication device that sent or otherwise transferred a particular media file to the service center.

The media collector 124 may be may be implemented using a combination of hardware, software, and/or firmware. For example, the media collector 124 may include or otherwise be in communication with at least one processor element and at least one memory element. More specifically, each of the automated data collector 128 and the dynamic media data collector 130 may include or otherwise be in communication with a processor element and at least one memory element. Any of the processor elements may be embodied in many ways. For example, a processor element may be embodied as a processor, coprocessor, a controller or various other processing means or devices including integrated circuits such as, for example, an application specific integrated circuit ("ASIC"). The memory elements described herein may be various memory structures including volatile and non-volatile memory structures. Any of the memory elements may be configured to store information, data, applications, instructions or the like for enabling the devices disclosed herein to carry out various functions in accordance with exemplary embodiments. For example, a memory element could be configured to buffer input data for processing by a respective processor element.

The media collector 124 or more specifically a processor element of the media collector may be configured to store the media files into user folders within a memory element. A user folder includes the media files of one user, i.e. uploaded or received from the user. One user may have more than one user folder wherein each user folder includes media files from the user based on additional attributes. For example, the user may have different folders depending on the type of media file, e.g., music, video, or picture and/or the user may have different folders pertaining to particular events, e.g., a soccer game, wedding, or graduation. Moreover, the media files may be stored within a folder hierarchy or tree structure and the metadata may also be saved into a searchable media metadata DB table to facilitate browsing between the media files or searching of the media files. As explained below, the media collector may notify or otherwise communicate with the media manager regarding the media files, the associated metadata, and the user folders to facilitate the publication or access to the media files by the owner user or other users.

The media manager 126 may include one or more computing devices. For example and according to the embodiment illustrated in FIG. 4, the media manager 126 may include a sharing manager server 132, a media content server 134, and a streaming sever 136.

The sharing manager server 132 may include or otherwise be in communication with a processor element and at least one memory element. The processor element may be configured to establish, including receiving instructions from users through communication devices and/or the account information sever, user groups. As stated above, each user group includes one or more member users. The sharing manager server 132 may also include access instructions regarding each user folder. For example, each user folder may have one of three access levels: public, group, and private. A public user folder allows access to any of the media files of the user folder by any other user. A group user folder allows access to any of the media files of the user folder by any other member user of a particular group. The access may include viewing stored media files, adding additional media files to the group user folder, and/or editing or deleting stored media files. A private user group limits access to the media files of the user folder to the owner user of the folder.

The sharing manager server 132 may be configured to authenticate or otherwise to determine the identity of the user making any request for access to a media file or folder. Or the sharing manager 132 may be in communication with the SSO Server to determine authentication. A user may request access to one or more folders from one or more communication devices 10, 11, 12, 13 including a different communication device that originally sent the media file to the service center, i.e. the transferring communication device.

The media content server 134 may allow users to search stored media files or folders. In particular, in communication with the sharing manager 132 and the media collector 124, the media content server 134 may be configured to accept search request from users through one or more communication device 10, 11, 12, 13. The media content server 134 may include a search engine to allow a user to search folders and files accessible to the user based on the access levels of the folders and the user's membership to one or more group. For example, the user may be able to search by media files or folder categories, file or folder ownership, or any other metadata. In addition or instead of providing search engine functions, the media content server 134 may be configured to allow users to browse media files, including by his folders or tree structure or the users may browse through the folders or tree structure of other users who have provided him access to the other users' folders or tree structures.

The streaming server 136 may be configured for conversion and publication of the media files. In general, the streaming server 136 may include a transcoding engine for converting the media file from a first format to a second format. Specifically, the first format may be from a first communication device that transmitted or sent the media file to the service center, i.e., the transferring communication device, and the second format may be determine by a second communication device requesting the media file, referred to herein as the requesting communication device. For example, the transcoding engine may format the media file suitable for the requesting communication device, such as a cellular phone, a pocket PC, a set top box, or a desktop. The second format may also be for sizing the output of the media file to be suitable for the requesting communication device. The streaming server 136 may be configured to publish, play, or send the media file to the requesting communication device in the second format, based on the user's request.

Each of the sharing manager server 132, the media content server 134, and the streaming sever 36 may include or otherwise be in communication with at least one processor element and at least one memory device. Any of the processor elements may be embodied in many ways. For example, a processor element may be embodied as a processor, a coprocessor, a controller or various other processing means or devices including integrated circuits such as, for example, an application specific integrated circuit ("ASIC"). The memory elements described herein may be various memory structures including volatile and non-volatile memory structures. Any of the memory elements may be configured to store information, data, applications, instructions or the like for enabling the devices disclosed herein to carry out various functions in accordance with exemplary embodiments. For example, a memory element could be configured to buffer input data for processing by a respective processor element.

Figure 5:
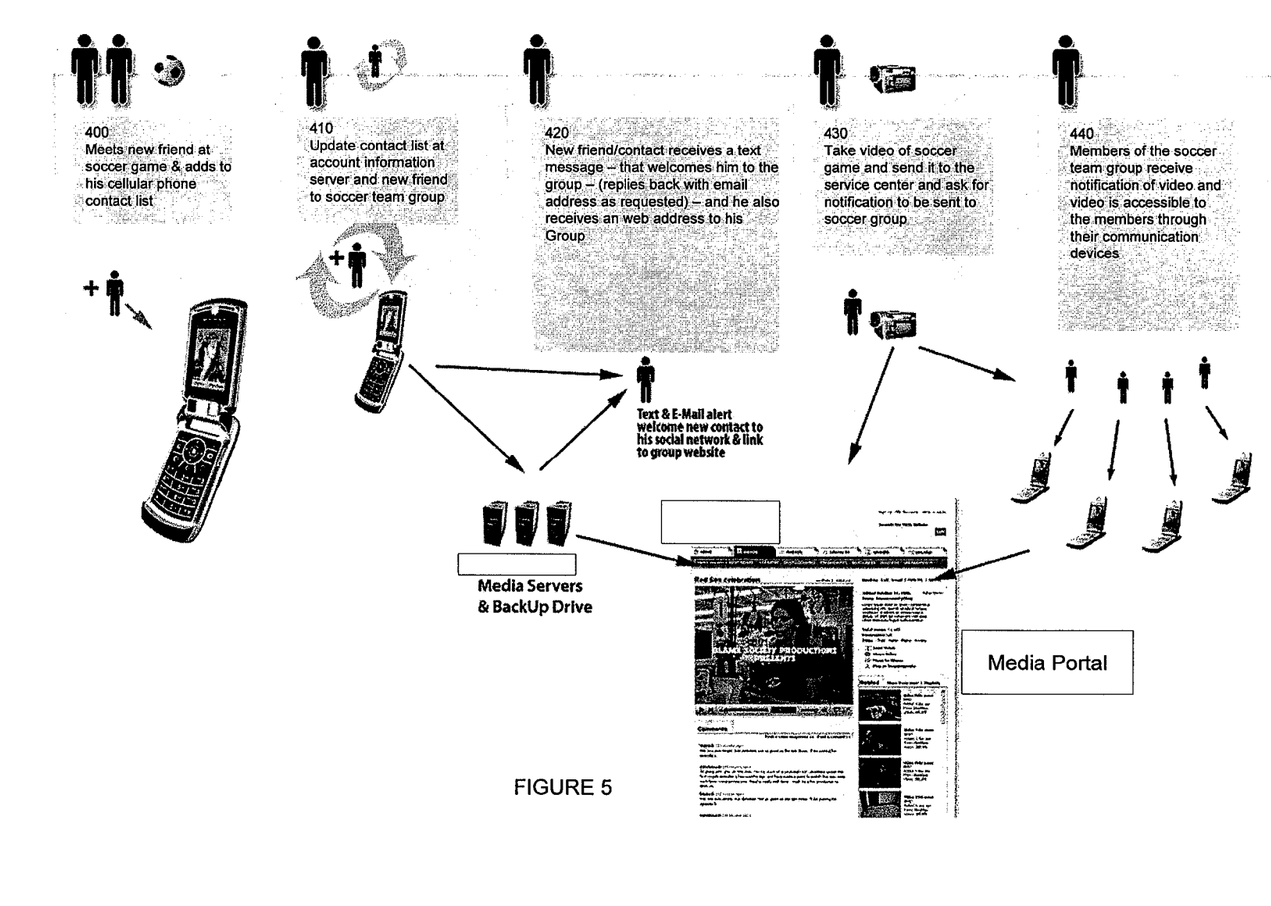
FIG. 5 is a flow chart illustration of a method according to an exemplary embodiment.

FIG. 5 illustrates a process consistent with some embodiments. A first user meets a new friend, i.e., a second user, at a soccer game or other event and adds the second user to his cellular phone contact list 400. The new contact on the cellular phone contact list may also be sent to the service center or more particularly to the account information server. The first user may add the second user to the first user's soccer team group or at least send a request to the service center for the second user to be added 410. In response, the service center may add the second user to the group and send a welcoming signal to the second user via the contact information of the first user's contact list. The welcoming signal may be a text message explaining the group and requesting additional information such as an email address of the second user 420. Or in response, the service center may send an invitation signal to the second user explaining the group and asking the second user to join the group. In this example, the second user is not added to the group unless the second user responds to the invitation signal and selects to join the group. The first user takes a video of the soccer game and sends the video to the media collector. The first user may further provide instructions for the service center to send a notice to each member of the soccer team group notifying them of the video 430. For example, each member of the soccer team may receive a text message and/or an email containing a link or attachment of the video along with any message provided by the first user 440.

Figure 6:
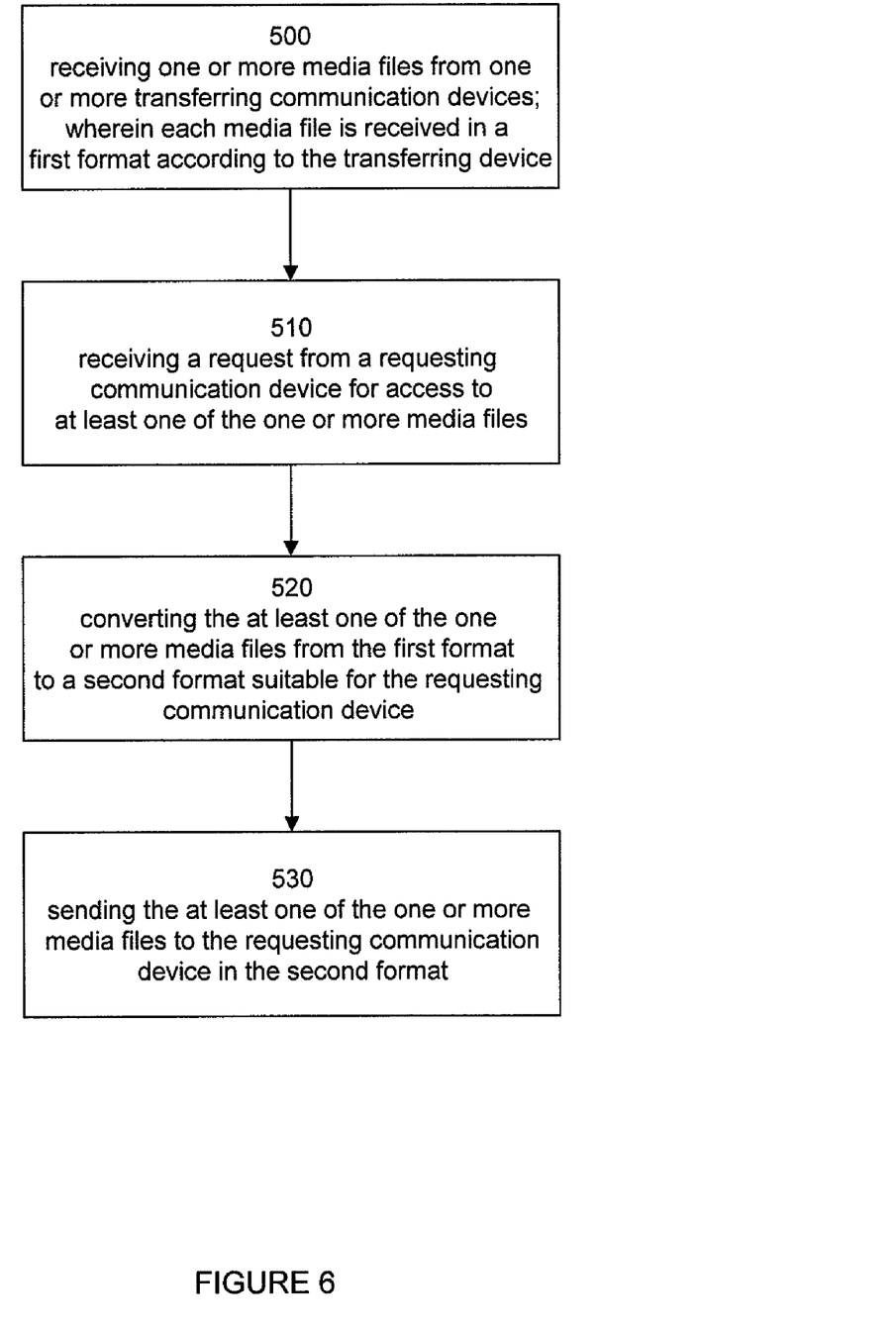
FIG. 6 is a flow chart illustration of a method according to another exemplary embodiment.
Figure 7:
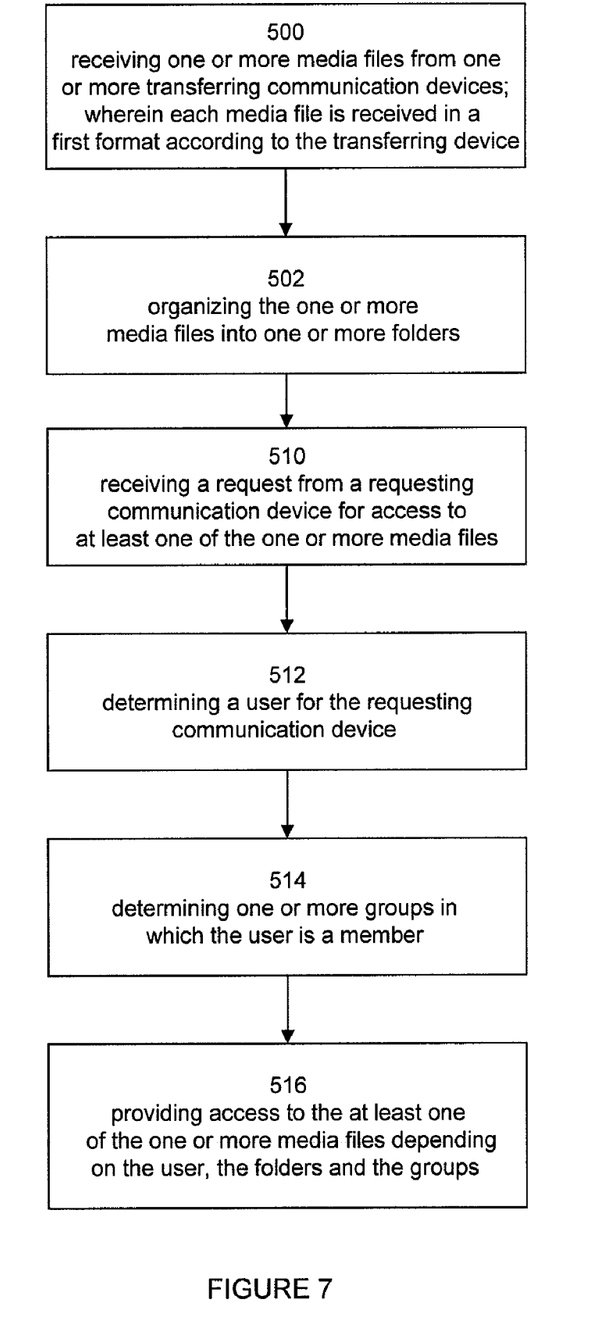
FIG. 7 is a flow chart illustration of a method according to another exemplary embodiment.

FIGS. 6 and 7 illustrate other examples of methods for providing media sharing. The method may include receiving one or more media files from one or more transferring communication devices 500. As explained above, each media file may be received in a first format according to the transferring device. The method may also include receiving a request from a requesting communication device for access to at least one of the one or more media files 510 and sending the at least one of the one or more media files to the requesting communication device 530. The sent media file may be in a second format that is suitable for the requesting communication device. As illustrated, the method may include converting the at least one of the one or more media files from the first format to the second format 520.

The method may further include organizing the received media files into one or more folders 502, determining a user for the requesting communication device 512, determining one or more groups in which the user is a member 514, and providing access to the at least one of the media files depending on the user, the folders, and the groups 516.

Figure 8:
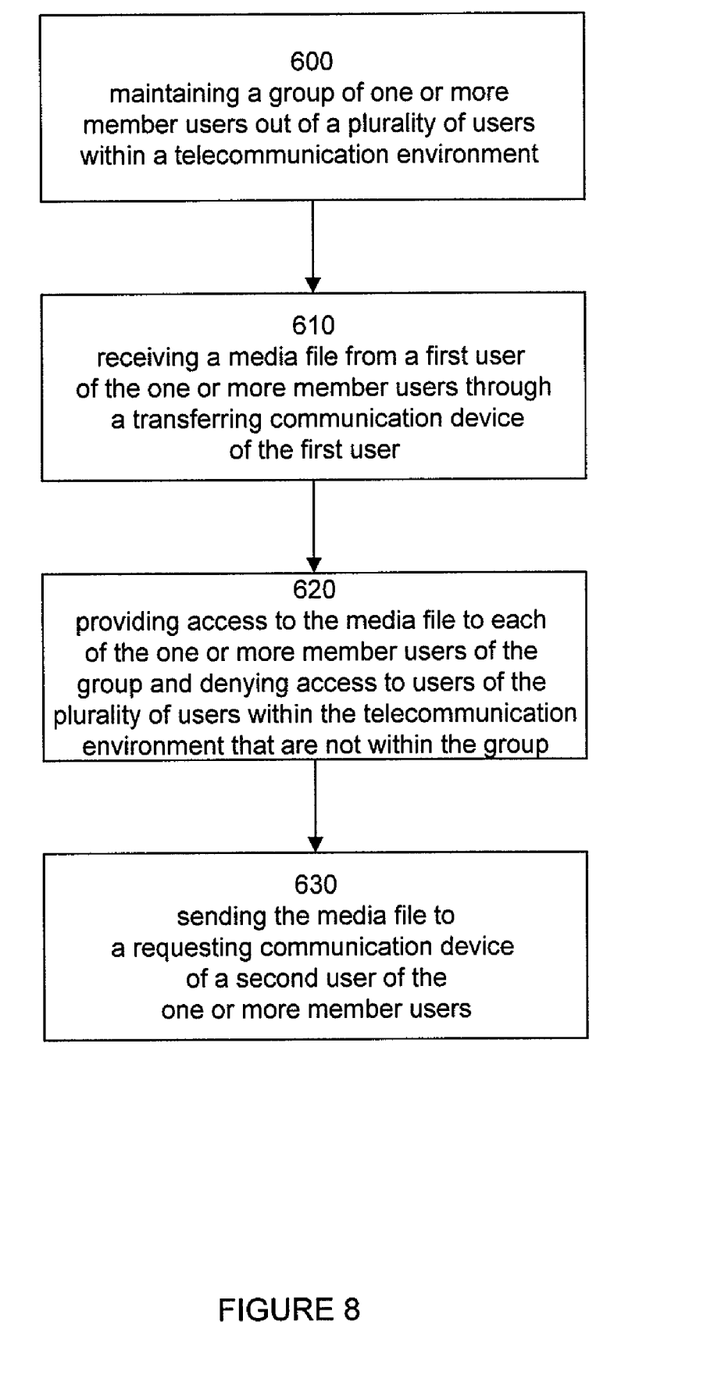
FIG. 8 is a flow chart illustration of a method according to yet another exemplary embodiment.

FIG. 8 illustrates another example of providing media sharing. The method may include maintaining a group of one or more member users out of a plurality of users within a telecommunication environment 600; receiving a media file from a first user of the one or more member users through a transferring communication device of the first user 610; providing access to the media file to each of the one or more members users of the group and denying access to users of the plurality of users within the telecommunication environment that are not within the group 620; and sending the media file to a requesting communication device of a second user of the one or more member users 630. The media file may be received in a first format based on the transferring communication device. The method may further include converting the media file from the first format to a second format that is suitable for the requesting communication device.

It is understood that the operations described for the illustrated methods of FIGS. 6 through 8 may be performed through hardware, software, or combination thereof. Therefore embodiments may take the form of hardware systems and/or apparatuses, software, or combinations thereof. As an example, embodiments may include a computer program product having a computer-readable storage medium (e.g., memory) and one or more executable portions (e.g., software) stored on the computer-readable storage medium for performing the operations described herein. As another example, one or more of the devices and/or systems of the service center may perform one or more of the operations. In one embodiment, a processor element of the service center may be configured to perform one or more of the operations illustrated in FIGS. 6 through 8.

In the preceding specification, various embodiments of the claimed invention have been described. It will, however, be evident that various modifications and changes may be made thereunto without departing from the broader spirit and scope of the invention as set forth in the claims that follow. The specification and drawings are accordingly to be regarded in an illustrative rather than restrictive sense.

That which is claimed:

1. A method comprising:
  receiving, at one or more server devices and from one or more first communication devices, a plurality of media files in a plurality of different media formats,
    each media file, of the plurality of media files, being received in a corresponding media format, of the plurality of different media formats, that is based on a corresponding first communication device, of the one or more first communication devices, from which the media file was received,
    at least one media file, of the plurality of media files, being received in a first media format for a group of users;
  storing, by the one or more server devices, the plurality of media files in a plurality of folders,
    a first media file, of the plurality of media files, being stored in a first folder, of the plurality of folders, that is based on a type of the first media file, and
    a second media file, of the plurality of media files, being stored in a second folder, of the plurality of folders, that is based on an event associated with the second media file;
  sending, by the one or more server devices, a notification to one or more second communication devices, of one or more users of the group of users, based on receiving the at least one media file,
    the notification providing an indication, to the one or more users, that the at least one media file has been received for the group of users;
  receiving, at the one or more server devices and from a second communication device of the one or more second communication devices, a request for access to the at least one media file,
    the request including information indicating that the second communication device is compatible with a second media format and not compatible with the first media format, the second media format being different than the first media format, and
    the at least one media file including at least one of an image file, an audio file, or a video file;
  converting, by the one or more server devices, the at least one media file from the first media format to the second media format, based on the information indicating that the second communication device is compatible with the second media format and not compatible with the first media format; and
  sending, by the one or more server devices, the at least one media file, in the second media format, to the second communication device,
    at least one of the one or more first communication devices or the second communication device being a mobile communication device.

2. The method according to claim 1, further comprising:
  determining an identity of a user of the second communication device;
  determining, based on the identity of the user, whether the user is authorized to access the at least one media file; and
  providing access to the at least one media file, of the plurality of media files, when the user is authorized to access the at least one media file.

3. The method according to claim 1, further comprising:
  determining one or more groups of which a user, of the second communication device, is a member; and
  providing access to the at least one media file, of the plurality of media files, to a user of the second communication device based
  on the determined one or more groups,
  where the at least one media file is stored in at least one of the folders, the at least one of the folders corresponding to:
    a particular type associated with the at least one media file, or
    a particular event associated with the at least one media file.

4. The method according to claim 1, further comprising:
receiving metadata associated with the plurality of media files;
receiving a search request based on the received metadata; and
providing access to one or more of the received plurality of media files based on the received search request.

5. A method comprising:
creating, by at least one server, a group of one or more users, of a plurality of users, the group being created based on call histories of at least one communication device of at least one of the one or more users of the group,
the call histories including information identifying one or more other users of the group;
receiving, by the at least one server, a media file from a first communication device of a first user, of the one or more users of the group, the media file being received in a first media format that is based on the first communication device, the media file including at least one of an image file, an audio file, or a video file;
storing, by the at least one server, the media file in a first folder, of a plurality of folders, that is based on a type of the media file,
another media file being stored in a second folder, of the plurality of folders, that is based on an event associated with the other media file;
sending, by the at least one server and to one or more communication devices associated with other users of the group, a notification indicating that the media file has been received for the group;
receiving, by the at least one server and based on the notification, a request for access to the media file,
the request being received from a second communication device of a second user, of the one or more users of the group, and
the request including information indicating that the second communication device is compatible with media files in a second media format and not compatible with media files in the first media format, the second media format being different than the first media format;
converting, by the at least one server and based on the information included in the request, the media file from the first media format to the second media format to obtain a converted media file;
providing, by the at least one server, access, to the converted media file, to the second user;
receiving, by the at least one server, requests for access to the media file, from one or more communication devices of one or more users, of the plurality of users, that are not included in the group; and
denying, by the at least one server, access, to the media file, to the one or more users, of the plurality of users, that are not included in the group.

6. The method according to claim 5, where providing the access to the converted media file includes:
sending the converted media file to the second communication device.

7. The method according to claim 5, further comprising:
sending a request for at least one media file to at least one of a plurality of communication devices associated with the one or more users of the group; and
receiving, at predetermined intervals, one or more additional media files from the at least one of the plurality of communication devices, based on sending the request.

8. The method according to claim 5, further comprising:
receiving, from a user, of the plurality of users, a search request for at least one media file stored in a particular folder, of the plurality of folders, the particular folder being associated with a particular access level of a plurality of access levels; and
providing, to the user, access to the particular folder based on:
the access level, and
a membership of the user to a particular group of users, of a plurality of groups of users, associated with the at least one media file.

9. The method according to claim 5,
where the first folder is associated with a first access level, of a plurality access levels, that allows the one or more users of the group to access the media file;
receiving another media file from the first communication device of the first user;
storing the received other media file in a third folder associated with a second access level, of the plurality access levels, that is different than the first access level and that allows only the first user to access the received other media file;
granting access, to the media file, to the one or more users of the group based on the first access level; and
denying access, to the received other media file, to the plurality of users, including the one or more users of the group, based on the second access level.

10. A non-transitory computer-readable storage medium comprising:
one or more instructions which, when executed by at least one processor of at least one server, cause the at least one processor to receive one or more media files from one or more first communication devices,
each media file, of the received one or more media files, being received in a media format according to a corresponding first communication device, of the one or more first communication devices, from which the media file was received,
at least one media file, of the received one or more media files, being received, in a first media format, for a group of one or more users;
one or more instructions which, when executed by the at least one processor, cause the at least one processor to store the received one or more media files in a plurality of folders,
a first media file, of the received one or more media files, being stored in a first folder, of the plurality of folders, that is based on a type of the first media file, and
a second media file, of the received one or more media files, being stored in a second folder, of the plurality of folders, that is based on an event associated with the second media file;
one or more instructions which, when executed by the at least one processor, cause the at least one processor to send a notification to one or more devices, of the one or more users, based on receiving the at least one media file for the group,
the notification including a reference to the at least one media file, and
the notification providing an indication, to the one or more users, that the at least one media file has been received for the group;
one or more instructions which, when executed by the at least one processor, cause the at least one processor to receive a request, from a particular device of the one or more devices, for access to the at least one media file, based on sending the notification;

one or more instructions which, when executed by the at least one processor, cause the at least one processor to determine, based on information included in the request, that the particular device is compatible with a second media format and not compatible with the first media format, the second media format being different than the first media format; and one or more instructions which, when executed by the at least one processor, cause the at least one processor to send the at least one media file, to the particular device, in the second media format based on the information included in the request.

11. The non-transitory computer-readable storage medium according to claim 10, further comprising:

one or more instructions to convert the at least one media file, from the first media format to the second media format, to obtain a converted at least one media file, the at least one media file including at least one of an image file, an audio file, or a video file, where the at least one media file is converted from the first media format to the second media format based on the information included in the request, where the information, included in the request, indicates that the particular device is compatible with the second media format and that the particular device is not compatible with the first media format, and where the one or more instructions to send the at least one media file to the particular device include:

one or more instructions to send the converted at least one media file to the particular device.

12. The non-transitory computer-readable storage medium according to claim 10, further comprising:

one or more instructions to determine an identity of a user associated with the particular device; and one or more instructions to provide access to the at least one media file based on the determined identity of the user.

13. The non-transitory computer-readable storage medium according to claim 10, further comprising:

one or more instructions to store the at least one media file in one of the plurality of folders, where the one of the plurality of folders is associated with an access level of a plurality of access levels; and one or more instructions to determine one or more groups of users of which a user, of the particular device, is a member, where the one or more instructions to provide access to the at least one media file include one or more instructions to provide access to the at least one media file based on:

the access level, or the determined one or more groups.

14. The non-transitory computer-readable storage medium according to claim 13, further comprising:

one or more instructions to receive metadata associated with the one or more media files; and one or more instructions to provide a second user access to search the one or more media files based on:

the received metadata, and one or more of the plurality of access levels.

15. A system comprising:

a memory to store instructions; and a processor element to execute the instructions in the memory to:

receive one or more media files from one or more first communication devices, each media file, of the one or more media files, being received in a media format according to a corresponding one of the first communication devices from which the media file is received, store the one or more media files in a plurality of folders, a first media file, of the one or more media files, being stored in a first folder, of the plurality of folders, that is based on a type of the first media file, and a second media file, of the one or more media files, being stored in a second folder, of the plurality of folders, that is based on an event associated with the second media file, send a notification to one or more second communication devices, of one or more users of a group of users, based on receiving at least one media file of the one or more media files, the at least one media file being received in a first media format, the at least one media file including at least one of an image file, an audio file, or a video file, the notification providing an indication, to the one or more users, that the at least one media file has been received for the group of users, receive a request, based on the notification and from a second communication device of the one or more second communication devices, for access to the at least one media file, the request including information indicating that the second communication device is compatible with a second media format and not compatible with the first media format, the second media format being different than the first media format, determine an identity of a user of the second communication device, based on receiving the request, and provide access to the at least one media file based on the determined identity of the user, where, when providing the access to the at least one media file, the processor element is further to:

send the at least one media file, to the second communication device, in the second media format based on the information included in the request.

16. The system according to claim 15, where the processor element is further to convert the at least one media file, from the first media format to the second media format, to obtain a converted at least one media file based on the information included in the request, and where, when sending the at least one media file, the processor element is to send the converted at least one media file to the second communication device.

17. The system according to claim 16, where the request for access comprises at least one of:

a request to view the at least one media file, or a request to edit the at least one media file.

18. The system according to claim 15, where the processor element is further to:

store the at least one media file in one of the plurality of folders, the one of the plurality of folders being associated with an access level of a plurality of access levels, and determine one or more groups of which the user is a member, where the processor element is further to provide access to the at least one media file based on:

access level, and the determined one or more groups.

19. The system according to claim 15, where the processor element is further to:
    receive metadata associated with the one or more media files, and
    provide access to the one or more media files based on a search associated with the received metadata.

20. The system according to claim 15, where, when receiving the one or more media files, the processor element is to receive a second media file for a second group of users, and where the processor element is further to send a second notification to one or more communication devices, of one or more users of the second group, based on receiving the second media file for the second group, the second notification providing an indication, to the one or more users of the second group, that the second media file has been received for the second group.

* * * * *